United States Patent

[11] 3,624,074

[72] Inventor Erwin Schmidt
    Kelkheim, Taunus, Germany
[21] Appl. No. 757,092
[22] Filed Sept. 3, 1968
[45] Patented Nov. 30, 1971
[73] Assignee Farbwerke Hoechst Aktiengesellschaft
    vormals Meister Lucius & Bruning
    Frankfurt am Main, Germany
[32] Priority Sept. 4, 1967
[33] Germany
[31] P 16 68 013.0

[54] PROCESS FOR PREPARING N-ACYL URETHANES
    5 Claims, No Drawings
[52] U.S. Cl. ................................................... 260/239 A,
    260/78 R, 260/239.3 R, 260/251 R, 260/256.4 C,
    260/268 C, 260/294.3 B, 260/307 A, 260/307 C,
    260/309.7, 260/326.3, 260/471 C, 260/482 B,
    260/482 C

[51] Int. Cl. ................................................... C07b 103/02,
    C07d 25/02, C07d 27/08
[50] Field of Search ........................................... 260/239 A,
    239.3 R, 482 C, 471 C

[56] References Cited
    OTHER REFERENCES
    Yocum et al., J. Org. Chem., Vol. 31, pages 3823– 3827
    (1966)

Primary Examiner—Alton D. Rollins
Attorney—Curtis, Morris & Safford

ABSTRACT: N-acyl urethanes useful as cocatalysts for lactam polymerization are obtained by reacting organic acid amides, such as carboxylic acid amides, carbamic acid esters or ureas, with trihalogeno-acetic acid esters, whereby trihalogenomethane is split off. The process is preferably catalyzed by amines, especially by tertiary or sterically hindered amines.

PROCESS FOR PREPARING N-ACYL URETHANES

The present invention relates to a process for preparing N-acyl urethanes.

We have found that N-acyl urethanes can be obtained by reacting organic amides, such as carboxylic acid amides, carbamic acid esters or ureas, carrying at least one hydrogen atom linked to an amide nitrogen atom, with trihalogeno-acetic acid esters. In particular it has been found that a compound of the general formula

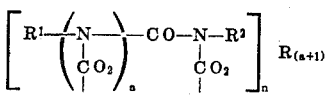

in which R represents an alkyl group containing one to 18 carbon atoms which may be substituted, an alkenyl group containing one to four carbon atoms, a cycloalkyl, aralkyl or aryl group or an alkylene group which may be substituted; $R^1$ and $R^2$ each represents a hydrogen atom, an alkyl group containing one to four carbon atoms, an aryl group or together a bivalent aliphatic radical, $a$ represents 0 or 1 and $n$ represents the integers 1 or 2, can be obtained by reacting $n$ mols of a compound of the general formula $R^1-(NH)_a-CO-NH-R^2$ in which $R^1$, $R^2$ and $a$ have the meanings given above with $(a+1)$ mols of a compound of the general formula $$(X_3C-CO_2)_nR$$

in which R and $n$ have the meanings given above and X represents a halogen atoms, at a temperature of from 0° to 200° C.

It is especially advantageous to carry out the reaction at a temperature of from about 0° to about 200° C. The necessary reaction temperature is considerably reduced or the reaction time is shortened when the reaction is carried out in the presence of basic catalysts, especially amines among which tertiary or sterically hindered amines have the highest catalytic activity. The reaction can generally be carried out using amides which carry at least one hydrogen atom linked to the amide nitrogen. Optimum yields are obtained by a reaction of cyclic amides, the amide groups of which are a constituent of a ring having four to eight ring atoms. It is surprising that the reaction proceeds smoothly and provides good yields since the acyl urethanes formed as reaction products, especially lactam-urethanes, are very reactive and, in particular, unstable in the presence of bases (cf. O.Wichterl et al., J. polym. Sci., 53, 250 (1961); Fortschr. der Hochpolym. Forsch. 2, 582 et seq. (1961) ). Moreover, it would have been expected that lactams used as starting materials would be polymerized by the acylurethanes formed under the reaction conditions of the invention.

The reaction can generally be carried out with esters of trihalogeno acetic acids, such as trifluoro-, tribromo- and triiodo-acetic acid, preferably with the trichloroacetic acid esters that can easily be obtained.

In general, it is possible to react halogeno-acetic acid esters of aliphatic, cyclo-aliphatic and aromatic alcohols which may also contain heteroatoms. For this purpose, esters of mono- and polyhydric alcohols as well as amides and thio-amides may also be used.

Optimum yields are obtained using cyclic amides, for example β-lactams, such as azetidinone-(2), 4-methyl-azetidinone-(2), 4,4-dimethyl-azetidinone-(2), 3,3-dimethyl-azetidinone-(2), 3,4-dimethyl-azetidinone-(2), 4-vinyl-azetidinone-(2), 4-phenyl-azetidinone-(2), -4-(p-chlorophenyl)-azetidinone-(2), 4-phenoxy-methyl-azetidinone-(2), 4-methyl-4-neopentyl-azetidinone-(2), 4-dodecyl-azetidinone-(2), as well as β-lactams of the constitutions

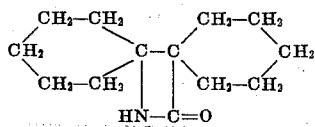

and

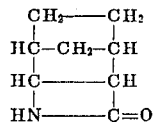

Unsubstituted and substituted pyrrolidones and piperidones are likewise suitable.

Poorer yields are obtained using ε-caprolactam and caprylocactam.

The reaction may also be carried out with ureas or urethanes and thio-derivatives thereof, for example N-methyl-imidazolidinone-(2) or oxazolidone-(2) or -(4). Open-chain amides may also be used for the reaction of the present invention, although the yields obtained are, in many cases, slightly reduced. As examples thereof there may be mentioned methylacetamide, acetamide, N-i-propyl-benzamide, benzyl-p-nitro benzamide, benzyl-urethane, N-methyl-carbamic acid ester. Cyclic and open-chain amides containing more than one amide nitrogen atom, may likewise be used in the reaction, for example ureas, such as urea, N-alkyl-ureas, N-aryl-ureas, N,N'-disubstituted ureas, especially cyclic ureas, such as imidazolidinone-(2), and thio-ureas into which one or two urethane groupings can be incorporated by the reaction of the invention; di-keto-piperazines carrying different substituents, poly-pyrrolidone, N,N'-bisacetyl-ethylenediamine, N,N'-dimethyl-oxamide or a di-lactam of the following structure

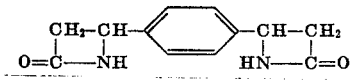

The reaction is likewise influenced by the alcohol radical of the trihalogeno-acetic acid ester used:

Trichloro-acetic acid esters of primary monohydric alcohols require only low reaction temperatures and provide optimum yields. An increasing alcohol radical requires somewhat raised reaction temperatures. The trichloro-acetic acid esters of dodecanol, hexa-decanol and octa-decanol can still be reacted with good yields. Trichloro-acetic acid esters the alcohol radicals of which contain further heteroatoms, for example polyglycol-mono-trichloro-acetate, 3,5-dimethoxy-benzyl-trichloroacetate, 2-methylsulfonyl-ethyltrichloroacetate or N-(β-trichloro-acetoxy-ethyl)-pyrrolidone-(2), can be also used for the reaction.

When trichloroacetic acid esters of secondary and tertiary alcohols are used, poorer yields are generally obtained; the same applies to the use of trichloroacetic acid phenyl esters and trichloro-acetic acid vinyl esters.

It is also possible to react polyalcohols that are esterified several times with, e.g. trichloroacetic acid, such as the corresponding esters of glycol, diglycol, polyglycol, pentaerythrite, glycerol, polyvinyl alcohol, according to the process of the invention.

As basic catalysts there are suitable alkali metal- and alkaline earth metal bases and salts of weak or unstable acids, such as sodium acetylide, pyrrolidone-potassium, phenyl-lithium, sodium hydride, calcium carbide, sodium alcoholate, sodium phenolate, sodium acetylacetonate, sodium acetate, calcium trichloro-acetate, sodium amide, sodium carbonate, potassium hydroxide, calcium oxide. Since, however, the use of alkali metal compounds gives rise to numerous side reactions, sometimes even with the formation of carbene, the reactions provide poorer yields.

Moreover, ammonia and amines are suitable as catalysts as well as salts and complex compounds thereof, such as quaternary ammonium salts and bases.

Tertiary and sterically hindered amines are especially suitable as catalysts since, in contrast to all the other catalysts mentioned, they have a high activity and do practically not cause side reactions. As examples that do not limit the invention, there may be mentioned triethylamine, N,N'-dimethyl-piperazine, dimethylbenzylamine, dimethylaniline, methyl-morpholine, tetramethyl-ethylene-diamine, triethanol-amine, dimethyl-amino-ethyl-stearic acid amide, urotropine, teriary butylamine, di-iso-propylamine, dicyclohexyl-ethylamine, di-iso-propyl-ethylamine (Hunig's base). Other compounds having a different basic character, also possess a catalytic activity, for example guanidine, thiodi-hexyl ether, triphenyl-phosphine, polyglycol, methyl-pyrrolidone, dimethyl-sulfoxide.

It is not possible exactly to define the reaction temperature since it depends to a large extent on the reactivity of the components, the solvent and the catalyst. When pyrrolidone-potassium is used as catalyst, a short vigorous reaction takes place already at room temperature but it does only provide a poor yield. Alternately, it may be necessary to employ temperatures above 200° C. when the reaction is carried out without using a catalyst or using trichloro-acetic acid esters having a low reactivity.

It is generally advantageous to carry out the reaction at a temperature of from about 30° to about 180° C., but higher or lower temperatures are also possible. The proportion at which the reaction components are combined may vary within wide limits. It is, for example, advantageous to use equimolar amounts of amide and trichloroacetic acid ester and to add a catalytic amount of amine. It is however, also possible to use as solvent a tertiary amine having catalytic activity. The amide or the trichloroacetic acid ester in excess may also be used as solvent.

Furthermore, suitable as diluents are all conventional organic solvents except strong organic acids.

There are suitable, for example, paraffin hydrocarbons, benzene, xylene, di-iso-propyl ether, carbon tetrachloride, chlorobenzene, iso-propanol, tertiary butanol, acetonitrile, benzonitrile, benzoic acid methyl ester, dioxane, trichloro-trifluoro-ethane, methyl-pyrrolidone, phosphoric acid tris-dimethylamide, dimethylsulfoxide. Polar solvents obviously have an additional accelerating effect on the reaction. The reaction provides trihalogenomethane as a byproduct which is advantageously separated by distillation during the reaction. It is also possible, especially when solvents having a low-boiling point are used, to operate under pressure or in a closed apparatus.

The reaction products obtained by of the invention can be used as cocatalysts in the lactam polymerization and are intermediates suitable for the synthesis of surface-active substances.

The following examples serve to illustrate the present invention, but they are not intended to limit it thereto.

EXAMPLE 1

100 Grams of 4,4-dimethyl-azetidinone-(2) and 200 milliliters of trichloroacetic acid methyl ester were heated to 150°–160° C. until no more chloroform was distilled off. The residue was poured into 750 milliliters of hexane. 113 Grams (72 percent of the theoretical yield) of N-carbomethoxy-4,4-dimethyl-azetidinone-(2) crystallized out and melted at 71° C. after recrystallization from iso-propanol.

| Analysis: | C calculated:53.48 | found:53.4;53.5 |
|---|---|---|
| | H calculated:7.05 | found:7.0;7.1 |
| | N calculated:8.91 | found:9.0;9.2 | molecular weight:calculated:157.17 Found:150

EXAMPLE 2

A mixture of 85 g. of pyrrolidone-(2), 200 ml. of trichloro acetic acid methyl ester, 1 ml. of ethylpiperidine was heated to 110° C. until no more chloroform was distilled off. By fractionating the residue in vacuo 130 g. (91 percent of the theoretical yield of 1-carboxymethyl-pyrrolidone-(2) of a boiling point of 118° C. under a pressure of 2 mm. mercury were obtained. The reaction product solidified at room temperature.

| Analysis | C calculated:50.35 | found:50.3;50.0 |
|---|---|---|
| | H calculated:6.34 | found: 6.3;6.5 |
| | -OCH₃ calculated:21.70 | found:21.7 |

EXAMPLE 3

Aceto-nitrile was separated by distillation from a solution of 17.2 g. of imidazolidinone-(2), 75 g. of trichloro acetic acid methyl ester and 0.8 ml. of ethylpiperidine in 100 ml. of acetonitrile while adding dropwise 200 ml. of acetonitrile until 4 g. of chloroform had passed over and finally the whole was completely concentrated by evaporation. The crystalline residue was triturated with methanol. The yield amounted to 28 g. (70 percent of the theoretical yield) of 1.3-bis-methoxycarbonyl-imidazolidinone-(2) which melted at 217° C. after recrystallization from glacial acetic acid.

| Analysis: | C calculated:41.59 | found:41.6;41.7 |
|---|---|---|
| | H calculated: 4.98 | found:4.9;5.2 |

EXAMPLE 4

73 g. of methylacetamide and 156 g. of trichloro acetic acid methyl ester were boiled using a column until 119 g. of chloroform were distilled. The residue was fractionated in vacuo. There was obtained N-carbomethoxy-N-methyl-acetamide having a boiling point under a pressure of 10 mm mercury of from 70°–73° C.

| Analysis: | C calculated:45.77 | found:45.6 |
|---|---|---|
| | H calculated:6.90 | found:6.9 |
| | N calculated:10.68 | found:10.5 |

EXAMPLE 5

20 g. of 4,4-dimethyl-azetidinone-(2), 25 g. of trichloro acetic acid benzyl ester, 1 drop of ethylpiperidine and 50 ml. of chlorobenzene were heated to 90°–130° C. using a column while adding dropwise 0.5 ml. of ethylpiperidine dissolved in chlorobenzene, until 12 g. of chloroform were distilled off. The residue was washed several times with water and dried over calcium chloride. After the solvent had been distilled off, 22.1 g. (98 percent of the theoretical yield of 1-carbobenzoxy-4,4-dimethyl-azetidinone-(2), crystallized on cooling and melted at 76° C. after recrystallization from iso-propyl ether.

| Analysis: | C calculated:66.93 | found:67.1 |
|---|---|---|
| | H calculated:6.48 | found:6.5 |

EXAMPLE 6

15 g. of cis-3.4-dimethyl-azetidinone-(2), 25 g. of trichloroacetic acid benzyl ester, 50 ml. of chlorobenzene and 5 drops of ethylpiperidine were heated to 90°–130° C. using a column while adding dropwise 0.5 ml. of ethylpiperidine dissolved in chlorobenzene, until 12 g. of chloroform were distilled off. The residue was washed with water, dried over calcium chloride and concentrated by evaporation. The yield was 11 g. of N-carbobenzoxy-lactam which was first recrystallized from iso-propyl ether at −60° C., then at room temperature. The melting point of the product was 60° C.

| Analysis: | C calculated:66.93; | found:67.0;66.7 |
|---|---|---|
| | H calculated:6.48; | found:6.4;6.7 |
| | N calculated:6.05; | 6.3;6.4 |

EXAMPLE 7

20.1 g. of trichloro acetic acid allylester, 20 g. of 4,4-dimethyl-azetidinone-(2), 100 ml. of chlorobenzene and 1.5 ml. of ethylpiperidine were boiled using a column until 12 g. of chloroform had passed over. There were obtained 15 g. (82 percent) of the theoretical yield of N-carboallyloxy-4,4-dimethyl-azetidinone-(2) of the boiling point of from 86°–89° C. under a pressure of 0.6 mm. mercury.

| Analysis: | C calculated:59.00 | found:58.7;58.7 |
|---|---|---|
| | H calculated:7.15 | found:7.1;7.1 |

EXAMPLE 8

250 ml. of aceto-nitrile were slowly separated by distillation from the solution of 22 g. of trichloro acetic acid-n-butylester, 12 g. of 4,4-dimethyl-azetidinone-(2 ) and 0.2 ml. of ethylpiperidine in 100 ml. of acetonitrile while adding dropwise another 200 ml. of acetonitrile, whereby 12 g. of chloroform passed over. The residue was taken up in water, extracted with hexane and cooled to $-60°$ C. after drying over calcium chloride and purification with animal charcoal. 12.6 g. (63 percent) of the theoretical yield of 1-carbobutoxy-4,4-dimethylazetidinone-(2 ), crystallized, but were liquified at room temperature. The boiling point of the product was in the range of from 96°–99° C. under a pressure of 0.3 mm. mercury.

| Analysis: | C calculated:60.28 | found:59.9;59.9 |
|---|---|---|
| | H calculated:8.60 | found:8.6:8.5 |
| | N calculated:7.03 | found:7.3 |

EXAMPLE 9

To a mixture which had been heated to 150° C. and which consisted of 33.2 g. of trichloro acetic acid dodecylester, 12 g. of 4.4-dimethylazetidinone-(2 ), 0.7 ml of ethylpiperidine and 100 ml. of benzonitrile, 100 ml. of acetonitrile were added dropwise in such a manner that it was at once distilled off again at a temperature of from 140°–160° C. When no more chloroform was separated from the destillate after water had been added, the reaction was complete. By fractionating in vacuo 28.8 g. of 1-carbododecyloxy-4,4-dimethyl-azetidinone-(2) of the boiling point of 170° C. under a pressure of 0.6 mm. mercury were obtained. Analogous to all urethanes obtained from $\beta$-lactames disclosed in the above examples, this product showed typical bands at 5.6$\mu$, 5.8$\mu$ and 12.9$\mu$ in the infrared spectrum.

EXAMPLE 10

A solution of 22.1 g. of trichloro acetic acid methylglycolester, 12 g. of 4,4-dimethyl-azetidinone-(2) and 0.7 ml. of ethylpiperidine in 100 ml. of benzonitrile was heated to 150° C. and 100 ml. of acetonitrile were slowly added dropwise thereto in such a manner that the acetonitrile was at once distilled off at an unaltered temperature. The residue was fractionated in vacuo. At 100° C./0.3 mm. mercury, 14.4 g. of N-carbo-(methoxy-ethoxy)-4.4-dimethyl-azetidinone passed over.

| Analysis: | C calculated:53.68 | found:53.5;53.8 |
|---|---|---|
| | H calculated:7.58 | found:7.4;7.4 |

EXAMPLE 11

A solution of 16.9 g. of glycol-bis-trichloro acetic ester, 12 g. of 4,4-dimethyl-azetidinone-(2) and 1.5 ml. of ethylpiperidine in 50 ml. of benzonitrile was heated to 150° C. and 100 ml. of acetonitrile were slowly added dropwise in such a manner that the acetonitrile was at once distilled off again. When no more chloroform passed over, the residue was fractionated in vacuo. A fraction that passed over at 140°C./1.5 mm. mercury showed the typical bands of N-carboalkoxy-$\beta$-lactames at 5.5$\mu$, 5.8$\mu$ and 12.95$\mu$

EXAMPLE 12

Acetonitrile was slowly separated by distillation from a solution of 20 g. of trichloro acetic acid-isopropylester, 12 g. of 4.4-dimethyl-azetidinone-(2) and 1.0 ml. of ethylpiperidine in 100 ml. of acetonitrile while adding the solvent dropwise until no more chloroform passed over. The residue was distilled in vacuo. A fraction that passed over at a boiling point of 62° C. under a pressure of 0.5 mm. mercury crystallized on cooling and could be recrystallized from hexane. Its infrared spectrum showed absorption at 5.6$\mu$, 5.8$\mu$ and 12.4$\mu$.

EXAMPLE 13

24 g. of trichloro acetic acid phenylester, 12 g. of 4,4-dimethyl-azetidinone-(2) and 1 ml. of ethylpiperidine were dissolved in 100 ml. of acetonitrile. After 100 ml. of benzonitrile had been added thereto the solvent was distilled off until the temperature of the residue amounted to 180° C. By distillation in vacuo a crystalline fraction having a boiling point of 74° C. under a pressure of 0.2 mm. mercury which was recrystallized from iso-propylether was obtained. Its infrared spectrum showed bands at 5.5$\mu$, 5.65$\mu$, 5.85$\mu$ and 12.2$\mu$.

EXAMPLE 14

38 g. of urea, 100 ml. of dimethylsulfoxide, 177 g. of trichloro acetic acid methylester and 2 ml. of ethylpiperidine were heated for 1 hour to 80° C. On cooling to 20° C. allophanic acid methylester crystallized. By concentrating the mixture in vacuo further product was obtained from the mother liquor.

EXAMPLE 15

177 g. of trichloro acetic acid methylester were added dropwise at 60° C. within 30 minutes to a solution of 170 g. of p-chlorophenyl urea and 7.0 g. of ethylpiperidine in 200 ml. of dimethylformamide. The temperature was raised to 80° C. by the reaction heat. 1 hour after the dropwise addition had been terminated the mixture was cooled and stirred with 1,500 ml. of water. After suction-filtration and drying 199 g. of 4-(p-chlorophenyl)-allophanic acid-methylester were obtained which was purified by recrystallization from methanol.

EXAMPLE 16

A solution of 184 g. of N-p-chlorophenyl-N'-methyl-urea in 500 ml. of dimethylformamide was combined with 5 ml. of ethylpiperidine and 177 g. of trichloro acetic acid methylester were added dropwise thereto at 80° C. within 1 hour. The mixture was maintained for 1 hour at the same temperature, then cooled and stirred with 3 l. of water. After suction-filtration and drying 217 g. of p-chlorophenyl-methyl-allophanic acid methylester, were obtained which was recrystallized from xylene.

EXAMPLE 17

10 ml. of ethylpiperidine were added to a mixture of 354 g. of trichloro acetic acid methylester, 168 g. of 4-methylazetidinone and 500 ml. dimethylformamide. The temperature of the mixture slowly rose on its own from 30° to 70° C. At this temperature the mixture was maintained for another 30 minutes, the solvent was distilled off in vacuo and the product was fractionated. There were obtained 209 g. of pure 1-carbomethoxy-4-methyl-azetidinone having a boiling point of 85° C. under pressure of 1 mm. mercury.

We claim:

1. A process for the preparation of N-acyl urethanes which comprises reacting an organic acid amide containing at least one hydrogen linked to an amide nitrogen with a trichloro acetic acid ester at a temperature of 0° to 200° C. to obtain an N-acyl urethane compound of the formula

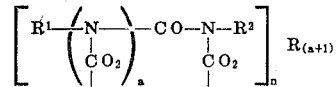

in which R is an alkyl group of one to 18 carbon atoms, lower alkenyl, benzyl, phenyl or lower alkylene, $R^1$ and $R^2$ are hydrogen, lower alkyl, phenyl, chlorophenyl or nitrophenyl or, when $R^1$ and $R^2$ are joined, these are lower alkylene, $a$ is 0 or 1 and $n$ is 1 or 2, wherein $n$ mols of said organic amide of the formula $$R^1-(NH)_a-CO-NH-R^2$$

in which $R^1$ and $R^2$ and $a$ have the meanings given above and are reacted with $(a+1)$ mols of the acetic acid ester of the formula $$(X_3C-CO_2)_n R$$

in which R and $n$ have the meanings given above and X is chloro.

2. The process as claimed in claim 1 wherein a tertiary amine is used as catalyst.

3. The process as claimed in claim 1, wherein a sterically hindered amine is used as catalyst.

4. The process as claimed in claim 1, wherein the reaction temperature is 30° to 180° C.

5. The process as claimed in claim 1, wherein a solvent is used.

* * * * *